(12) United States Patent  
Chandy et al.

(10) Patent No.: US 9,114,826 B2  
(45) Date of Patent: Aug. 25, 2015

(54) CROSS CHECK STRATEGY FOR SYSTEMATIC ERROR PROTECTION

(71) Applicant: STEERING SOLUTIONS IP HOLDING CORPORATION, Saginaw, MI (US)

(72) Inventors: Ashok Chandy, Fenton, MI (US); Scott Millsap, Grand Blanc, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 14/203,844

(22) Filed: Mar. 11, 2014

(65) Prior Publication Data

US 2014/0257639 A1  Sep. 11, 2014

Related U.S. Application Data

(60) Provisional application No. 61/776,141, filed on Mar. 11, 2013.

(51) Int. Cl.
| | |
|---|---|
| *B62D 6/00* | (2006.01) |
| *B62D 5/04* | (2006.01) |
| *C10M 169/06* | (2006.01) |
| *B62D 11/00* | (2006.01) |
| *F16H 47/00* | (2006.01) |

(52) U.S. Cl.
CPC ............ *B62D 5/0493* (2013.01); *B62D 5/0484* (2013.01); *B62D 5/04* (2013.01); *B62D 11/00* (2013.01); *C10M 169/06* (2013.01); *F16H 47/00* (2013.01)

(58) Field of Classification Search
CPC ........ B62D 5/04; B62D 5/0463; B62D 11/00; C10M 169/06; C10M 169/04; F16C 33/6633; F16H 47/00; F16H 47/085; F16H 61/02; F16H 59/02

See application file for complete search history.

(56) References Cited

U.S. PATENT DOCUMENTS

| | | | | |
|---|---|---|---|---|
| 3,726,094 | A | * | 4/1973 | Schaefer .......................... 60/488 |
| 5,428,537 | A | * | 6/1995 | Kamono et al. ................. 701/41 |
| 7,867,956 | B2 | * | 1/2011 | Asakura et al. ................ 508/179 |

(Continued)

FOREIGN PATENT DOCUMENTS

| | | |
|---|---|---|
| EP | 0554703 A1 | 8/1993 |
| EP | 1149754 A2 | 10/2001 |

OTHER PUBLICATIONS

European Search Report for EP Application No. 14158679.2 dated Jul. 2, 2014; 7 pages.

*Primary Examiner* — Behrang Badii  
(74) *Attorney, Agent, or Firm* — Cantor Colburn LLP

(57) ABSTRACT

A method for generating and verifying an output command for using in a power steering system is provided. The method receives, by a module having at least a primary processing path and a secondary processing path that is in parallel with the primary processing path, a set of input signals. In the primary processing path, the method generates a primary output command based on the set of input signals and sends the primary output command out of the module. In the secondary processing path, the method generates a first range of command values based on the set of input signals, determines whether the primary output command falls within the range of command values, and generates a fault signal based on determining that the primary output command does not fall within the first range of command values.

20 Claims, 10 Drawing Sheets

(56) References Cited

U.S. PATENT DOCUMENTS

2008/0161214 A1\* 7/2008 Asakura et al. ............... 508/179
2009/0065287 A1\* 3/2009 Kuwabara et al. ............ 180/444
2013/0083832 A1\* 4/2013 Sorensen ...................... 375/224

\* cited by examiner

CROSS CHECK STRATEGY FOR SYSTEMATIC ERROR PROTECTION

CROSS-REFERENCES TO RELATED APPLICATIONS

This patent application claims priority to U.S. Provisional Patent Application Ser. No. 61/776,141 filed Mar. 11, 2013 which is incorporated herein by reference in its entirety.

BACKGROUND OF THE INVENTION

The International Organization for Standardization (ISO) 26262 Functional Safety standard recommends diverse software designs to facilitate the detection and mitigation of software systematic errors that could lead to an abnormal assist torque output for an electric power steering (EPS) system. Prior software designs made use of software firewalls (generally, saturation limiters) to mitigate errors that may cause an abnormal assist torque output. However, these saturation limiters in the assist torque calculation paths may also degrade the steering system performance as well as interfere with assist torque output calculation. Other software design measures, such as redundant memory storage and comparison of safety critical software variables, have been used as well. However, these design measures are often best applied to mitigate the hardware sources of errors that affect the software computations. Accordingly, it is desirable to provide methods and systems that can mitigate errors without affecting the steering system performance and assist torque calculation too much.

SUMMARY OF THE INVENTION

In one embodiment of the invention, a method for generating and verifying an output command for using in a power steering system is provided. The method receives, by a module having at least a primary processing path and a secondary processing path that is in parallel with the primary processing path, a set of input signals. In the primary processing path, the method generates a primary output command based on the set of input signals and sends the primary output command out of the module. In the secondary processing path, the method generates a first range of command values based on the set of input signals, determines whether the primary output command falls within the range of command values, and generates a fault signal based on determining that the primary output command does not fall within the first range of command values.

In another embodiment of the invention, a control system for controlling a power steering system is provided. The control system comprises a primary processing path and a secondary processing path in parallel with the primary processing path. The control system further comprises a first module in the primary processing path. The first module is configured to generate a primary output command based on a set of input signals and to output the primary output command. The control system further comprises a second module in the secondary processing path. The second module is configured to generate a first range of command values based on the set of input signals, to determine whether the primary output command falls within the range of command values, and to generate a fault signal based on determining that the primary output command does not fall within the first range of command values.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
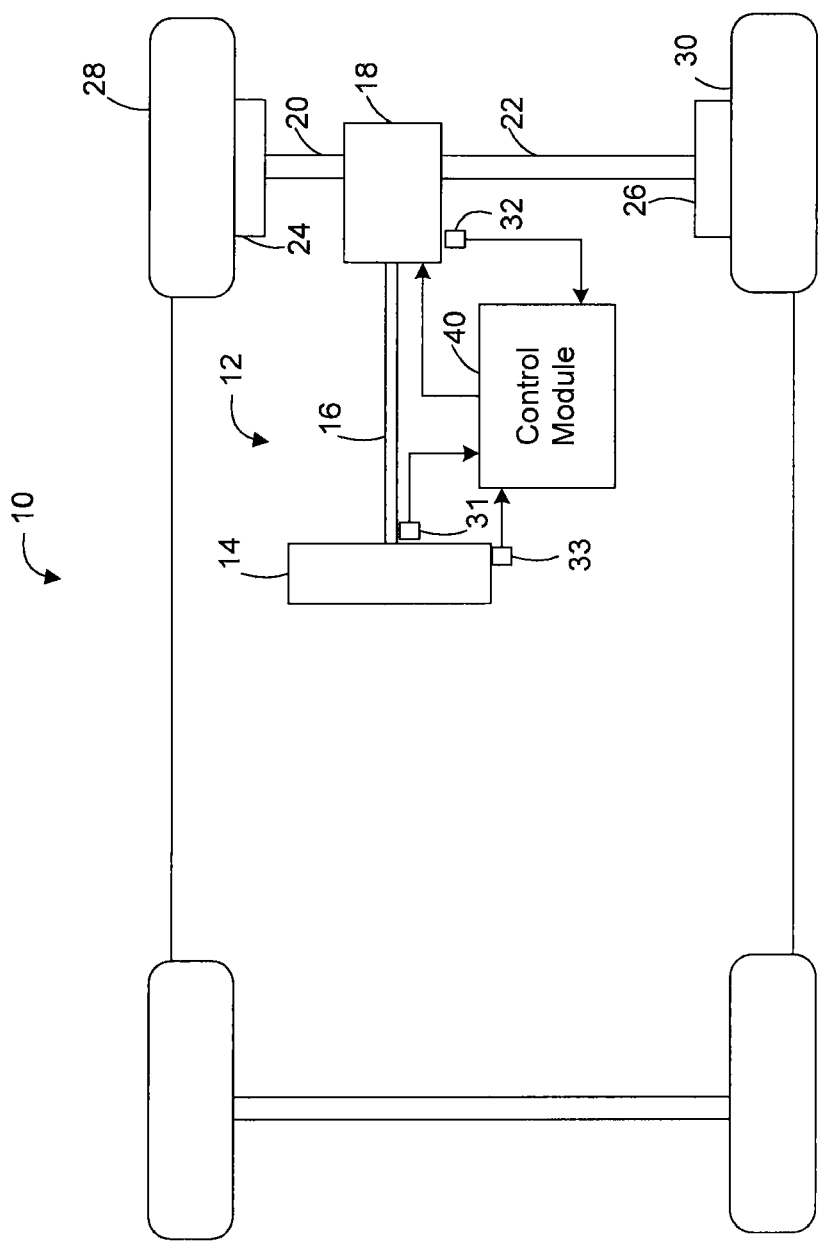
FIG. 1 is a functional block diagram of a steering system that includes a control system for controlling the steering system in accordance with exemplary embodiments.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator, the motor (not shown) of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 10. The sensors 31-33 generate sensor signals based on the observable conditions. In various embodiments, the sensors 31-33 include, for example, a hand wheel position sensor, a hand wheel torque sensor, a vehicle velocity sensor, a motor position sensor, etc. These sensors send the signals to the control module 40.

In various embodiments, a control module 40 controls the operation of the steering system 12 and/or the vehicle 10 based on one or more of the sensor signals and further based on the cross-check systems and the methods of the present disclosure. Generally speaking, the control module 40 of various embodiments of the invention maintains at least a primary signal path and a secondary signal path (not shown). In the primary signal path, the control module 40 has a set of logics that is configured to compute a primary output command (e.g., an assist torque command). In the secondary signal path, the control module 40 has a set of logics that is configured to verify or cross-check the primary output command from the primary signal path for errors in the primary signal path. By maintaining separate primary and secondary signal paths, the control module 40 can validate the output command without affecting the output command generation process.

In one embodiment, the set of logics in the secondary signal path determines whether the output from the primary signal path is out of a range of command values. Based on determining that the output from the primary signal path is out of the range, the set of logics in the secondary signal path generates a fault signal that indicates there is an error in the primary signal path and the output command is faulty. In one embodiment, the set of logics in the secondary path initiates a set of fault response actions in the control module 40 or in the steering system 12 upon determining the fault. In an embodiment, a fault response action is an action taken by the components (e.g., the control module 40 and its sub-modules, the steering assist unit 18, etc.) of the steering system 12 in response to the fault, for remedial or mitigating purposes.

In one embodiment, the set of logics in the secondary path verifies or cross-checks the default output command by, for example, determining whether the default output command from the primary signal path is out of a range of command values. Based on determining that the default output command from the primary signal path is out of this range, the set of logics in the secondary signal path generates a fault signal that indicates that the default output command is faulty. In one embodiment, the set of logics in the secondary path initiates a set of fault response actions in the control module 40 or in the steering system 12 upon determining the fault.

Figure 2:
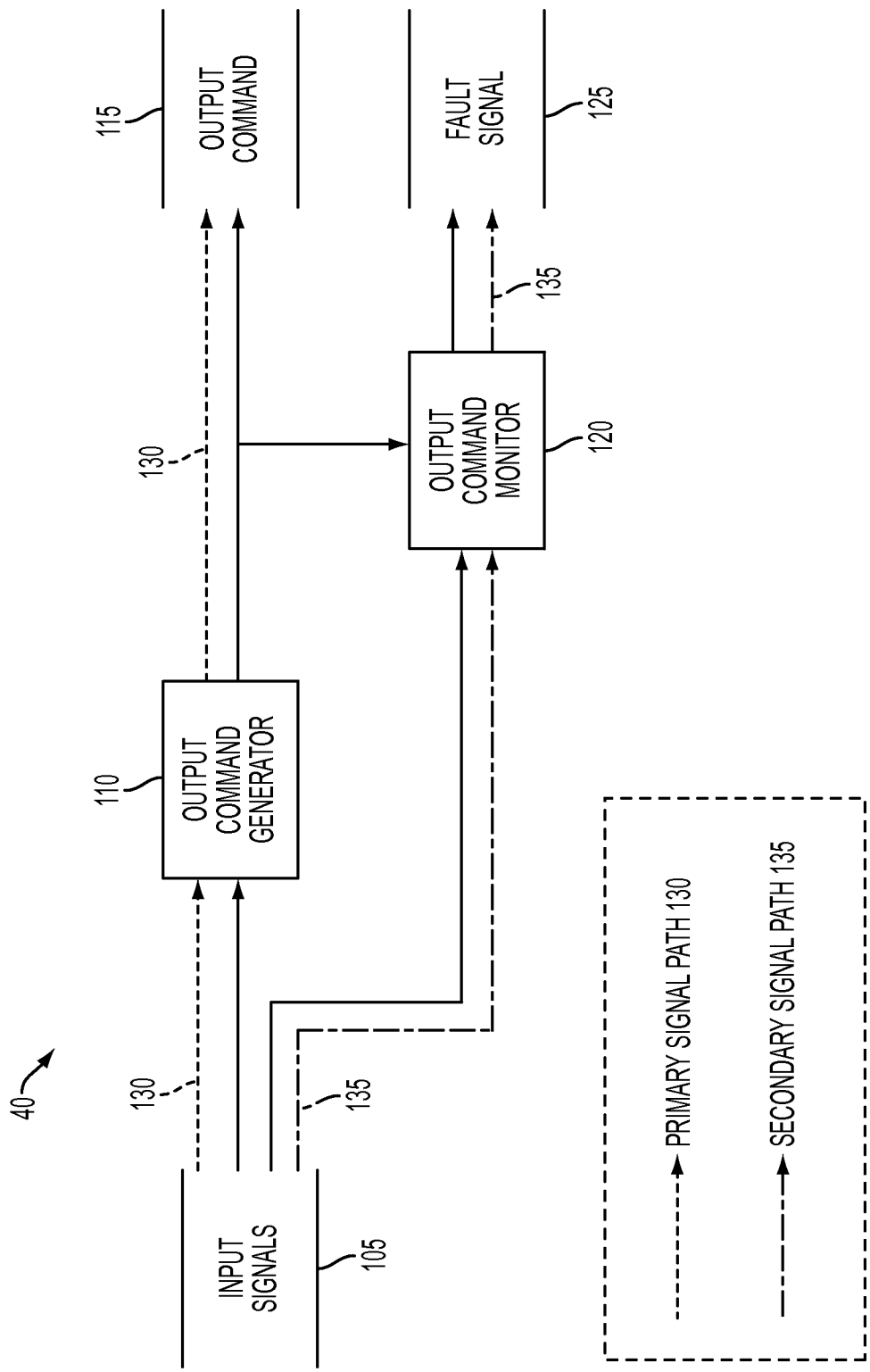
FIG. 2 illustrates a block diagram of a control module that controls a steering system in accordance with exemplary embodiments of the invention.

FIG. 2 illustrates a block diagram of the control module 40 that controls the steering system 12 and/or the vehicle 10 of FIG. 1 in accordance with exemplary embodiments of the invention. The control module 40 may include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned.

As shown, in one embodiment, the control module 40 takes input signals 105 and produces an output command 115 and/or a fault signal 125. Input signals 105 to the control module 40 are generated from the sensors of the vehicle 10 (FIG. 1), which can be modeled within the control module 40 (e.g., by other sub-modules (not shown)) in one embodiment. The input signals 105 may also be received from other control modules of the vehicle 10 (FIG. 1). The output command 115 is a command signal outputted to another part of the steering system 12 (e.g., the steering assist unit 18). For example, the output command 115 is an assist torque command that is sent to the steering assist unit 18 and causes the motor of the steering assist unit 18 to produce a specified amount of assist torque to aid the operator of the vehicle in steering.

The control module 40 generates the output command 115 based on, for example, a hand wheel torque signal from a hand wheel torque sensor. The fault signal 125 is also a command signal that initiates a fault response action in the steering system 12. For example, the steering system 12 generates assist torque in a limited fashion before shutting itself down. In one embodiment, the fault signal 125 is also sent to another sub-module (not shown) of the control module 40. The other sub-module generates a diagnostic code based on the fault signal 125 and reports the diagnostic code according to various reporting methods, including, but not limited to, using in-vehicle communication reporting messages and/or off-vehicle reporting messages.

In one embodiment, the control module 40 maintains at least two parallel signal paths 130 and 135 to separate a verification process from an output command generation process. For example, the control module 40 includes an output command generator 110 that produces the output command 115 in the primary signal path 130. An output command monitor 120 that produces the fault signal 125 is in a secondary signal path 135. By not being in the primary signal path, the output command monitor 120 can verify the output command and produce the fault signal 125 without delaying or interfering with the output command generation process performed by the output command generator 110.

It is to be noted that the control module 40 may include numerous sub-modules even though the output command generator 110 and the output command monitor 120 are the only sub-modules of the control module 40 illustrated in FIG. 2. Moreover, the output command generator 110 and the output command monitor 120 do not have to be modules that directly take as inputs the inputs to the control module 40 or produce the output command and the fault signal that are sent out of the control module 40. That is, in one embodiment, the output command generator 110 and the output command monitor 120 interacts with other sub-modules of the control module 40 such that the input signals 105 are the outputs of other sub-modules of the control module 40 and the output command 115 and the fault signal 125 are sent to other sub-modules of the control module 40. Therefore, it follows that the separation of the verification process and the output command generation process into two parallel signal paths is applicable to any sub-modules of the control module 40.

Figure 2A:
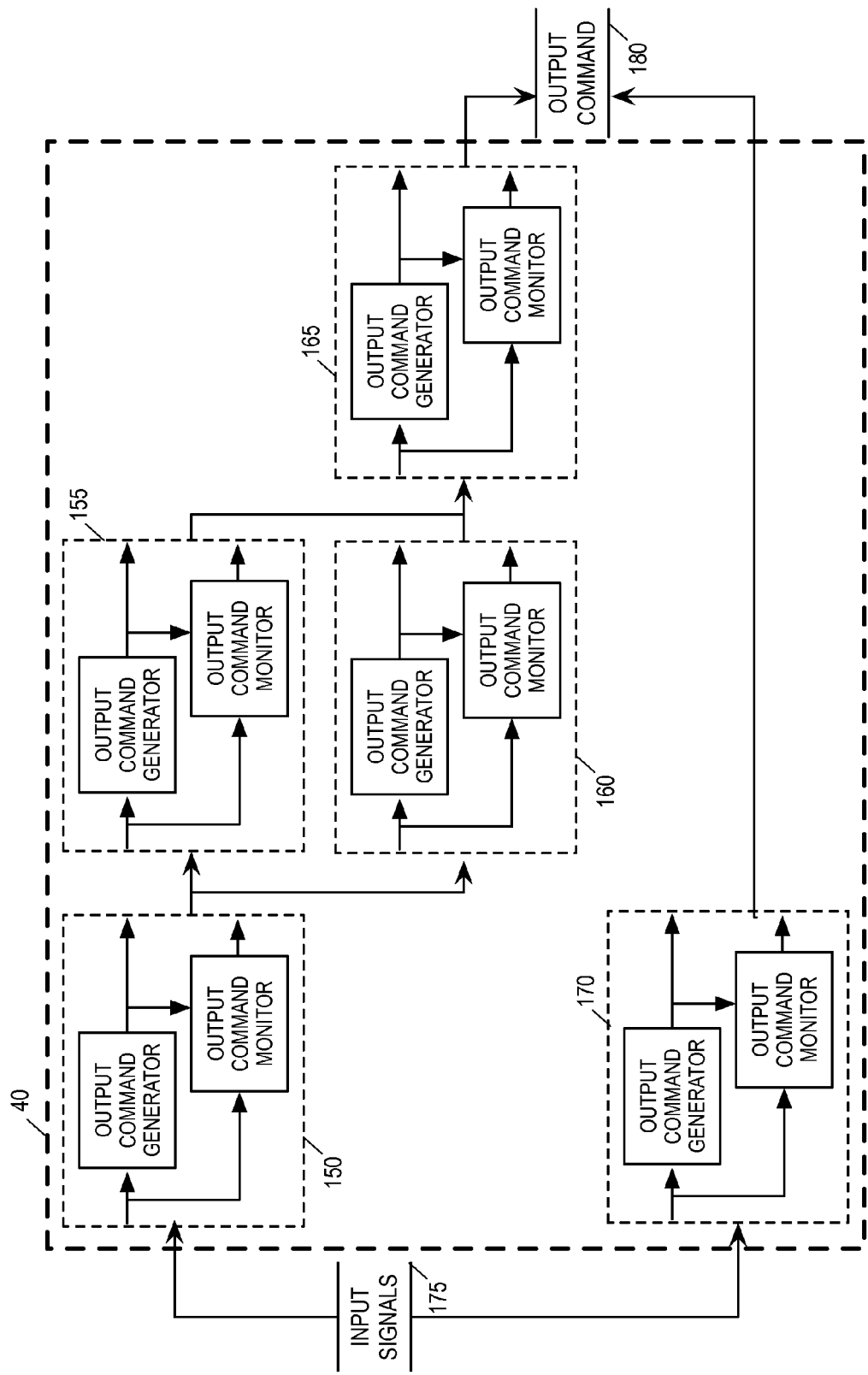
FIG. 2a illustrates a block diagram of a control module that controls a steering system in accordance with exemplary embodiments of the invention.

FIG. 2a illustrates such an example of the control module 40. Specifically, FIG. 2a illustrates that the control module 40 includes five pairs 150-170 of the output command generator and the output command monitor. The pairs 150 and 170 takes as inputs the input signals 175 to the control module 40 and send its output command and/or fault signal to other sub-module(s) (i.e., the pairs 155 and 160). The pairs 155 and 160 each take as inputs the outputs of other sub-module(s) (i.e., the pair 150) and send its output commands and/or fault signals to other sub-module(s) (i.e., the pair 165). The pair 165 takes as inputs the outputs of other sub-module(s) (i.e., the pairs 155 and 160) and send its output command and/or fault signal as output command 180 of the control module 40. The pair 170 takes as inputs the input signals 175 of the control module 40 and sends its output command and/or fault signal as output command 180 of the control module 40.

Figure 3:
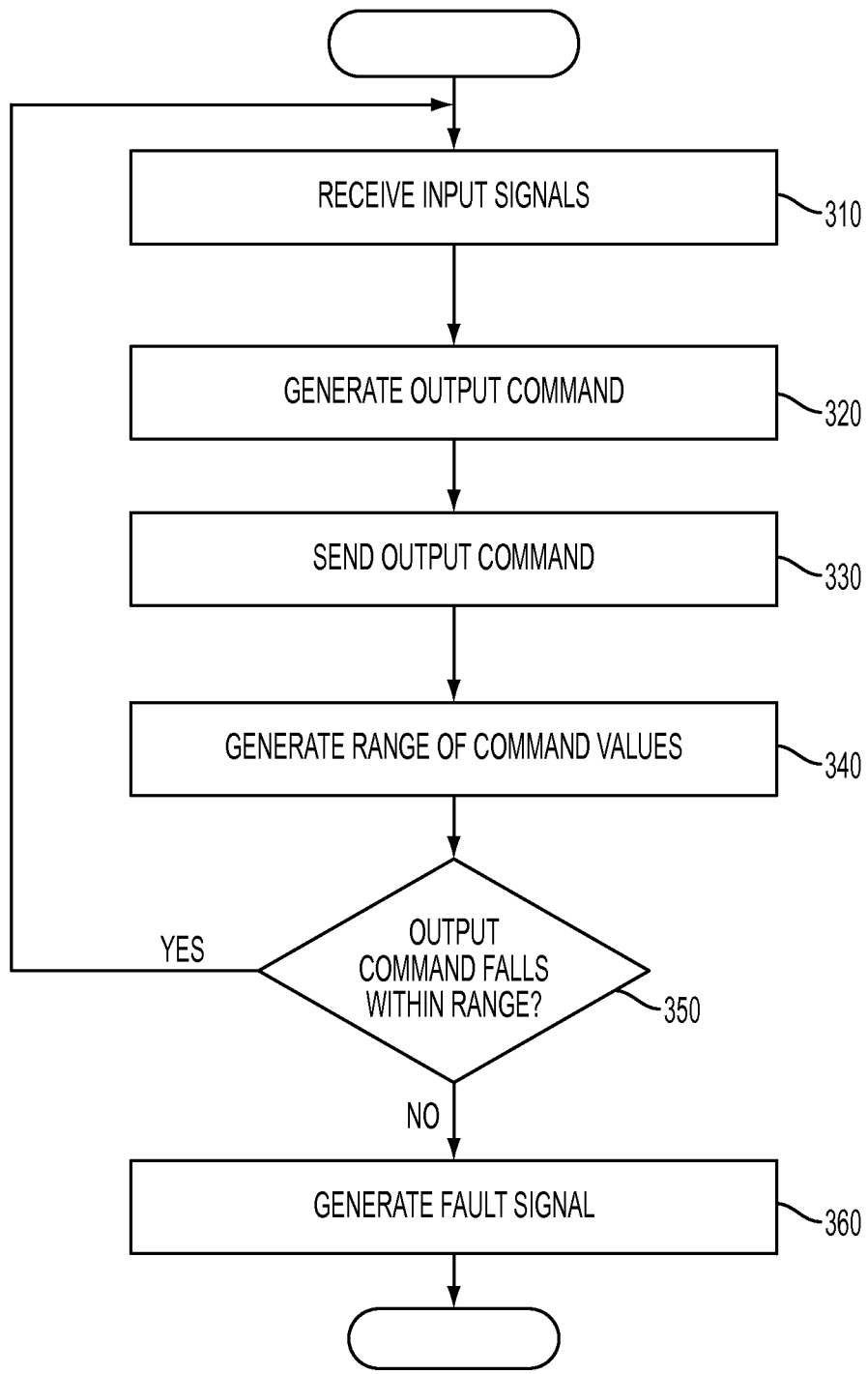
FIG. 3 is flow diagram illustrating a control method for controlling a steering system in accordance with exemplary embodiments.

Referring back to FIG. 2 and with reference to FIGS. 1 and 3, an example operation of the control module 40 in various embodiments will now be described. FIG. 3 illustrates a flow diagram for a control method that can be performed by the output command generator 110 and the output command monitor 120 of the control module 40. As can be appreciated in light of the disclosure, the order of operation within the method is not limited to the sequential execution as illustrated in FIG. 3, but may be performed in one or more varying orders as applicable and in accordance with the present disclosure.

In one example, the output command generator 110 and the output command monitor 120 at block 310 receive a set of input signals 105 from one or more of the sensors 31-33 that generates the signals or from one or more of the sub-modules of the control module 40 that produce these input signals. The input signals 150 may include a hand wheel position signal, a hand wheel torque signal, a motor velocity signal, etc.

At block 320, the output command generator 110 generates an output command based on one or more of the input signals 105. For example, the output command generator 110 generates a hand wheel torque signal from a hand wheel position and/or a hand wheel velocity signal. As another example, the output command generator 110 generates an assist torque command for commanding the steering assist unit 18 to generate a specified amount of assist torque. The output command generator 110 then sends at block 330 this output command 115 to another sub-module of the control module 40 or to another part of the steering system 12 (e.g., the motor of the steering assist unit 18). It is to be noted that the output command 115 is not verified or cross-checked in the primary signal path 130 before being outputted.

At block 340, the output command monitor 120 generates a range of command values based on one or more of the input signals 105. For instance, the output command monitor 120 generates a range of assist torque command values for determining whether the output command 115 is faulty. The output command monitor 120 may calculate the range based on the input signals 105 or finds the range in a look up table that is indexed by the values of the input signals 105.

At block 350, the output command monitor 120 determines whether the output command 115 falls within the range. Based on determining at block 350 that the output command 115 falls within the range, the method loops back to block 310 so that the control module 40 repeats the operations at blocks 310-350 based on the newer input signals.

Based on determining at block 350 that the output command 115 does not fall within the range, the output command monitor 120 at block 360 generates a fault signal and/or initiates a set of fault response actions (e.g., remedial or mitigating actions). For example, the output command monitor 120 may send the fault signal to other sub-modules of the control module 40 so that the receiving sub-modules may ignore the output command 115 and use a backup command as inputs. The receiving sub-modules may also cause the steering system 12 to perform its function (e.g., generating assist torque) in a limited fashion or to start shutting down. The receiving sub-modules may also be the modules that supply the input signals 115 to the output command generator 110. In such cases, the receiving sub-modules may isolate the output command generator 110 by, e.g., bypassing the output command generator 110.

Figure 4:
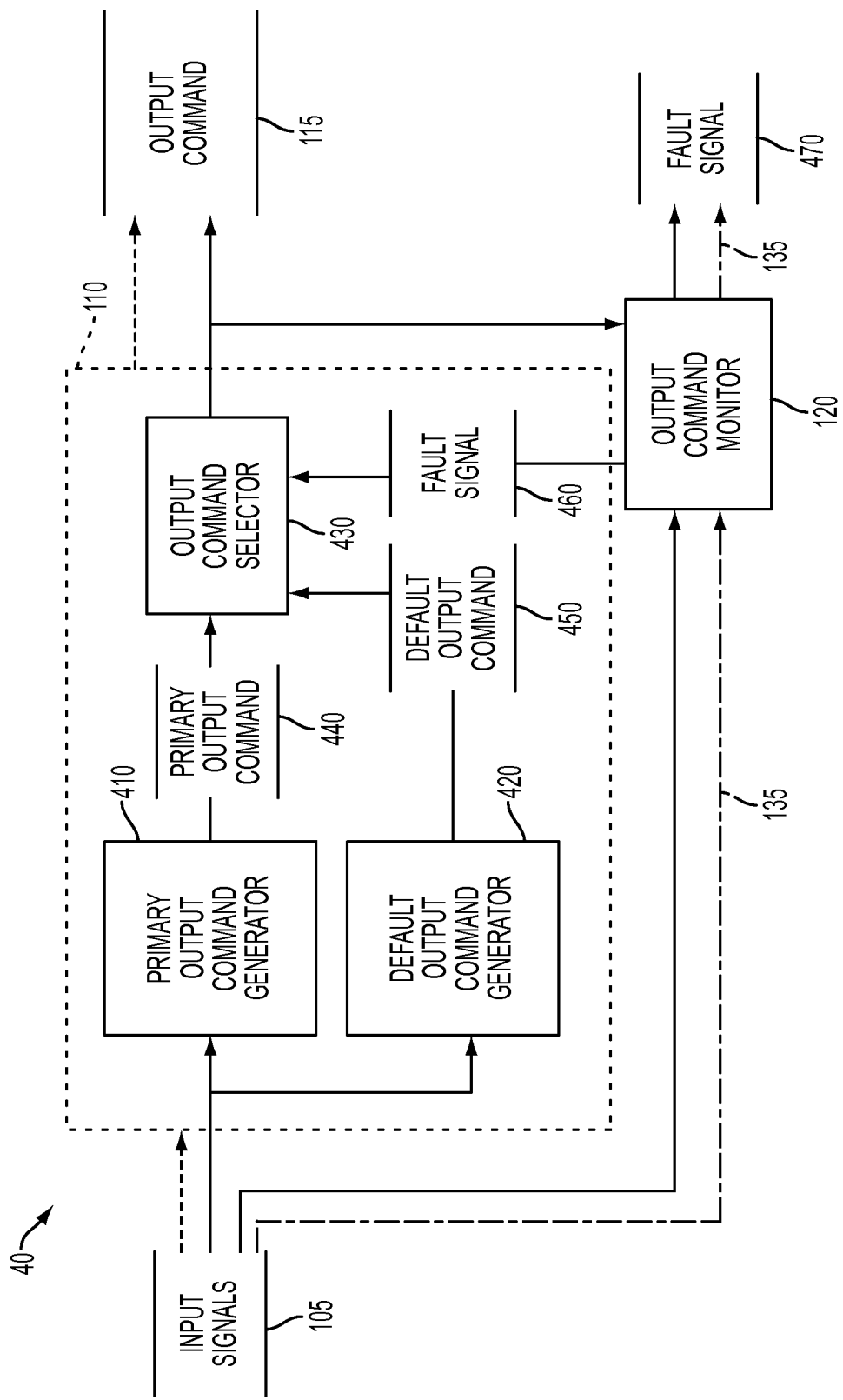
FIG. 4 illustrates a block diagram of a control module that controls a steering system in accordance with exemplary embodiments of the invention.

FIG. 4 illustrates a block diagram of the control module 40 in accordance with various embodiments of the invention. Specifically, FIG. 4 illustrates that the control module 40 performs an output command generation process in two different operational modes—a normal mode and a default mode. In the normal mode, the control module 40 performs the output command generation process as designed. That is, the control module 40 generates the output command by, for example, using all the input signals, parameters, and/or algorithms as designed. In the default mode, however, the control module 40 performs the output command generation process in a degraded fashion. For example, the control module 40 operating in the default mode generates an output command using only a subset of those input signals, parameters, and/or simpler algorithms that the control module 40 operating in the normal mode would use.

As shown in FIG. 4, the output command generator 110 includes a primary output command generator 410, a default output command generator 420, and an output command selector 430. The primary output command generator 410 generates a primary output command 440 which is outputted when the control module 40 is in the normal mode. The default output command generator 420 generates a default output command 450 which is outputted when the control module 40 is in the default mode. The output command selector 430 selects and outputs the primary output command 440 as the output command 115 when the control module 40 operates in the normal mode. The output command selector 430 selects and outputs the default output command 450 as the output command 115 when the control module 40 operates in the default mode.

In one embodiment, the output command monitor 120 triggers a switch between the two operational modes of the control module 40 based on determining whether the primary output command is within a range of command values. For example, based on determining that the primary output command 440 is out of the range, the output command monitor 120 generates a fault signal 460, which, in one embodiment, indicates that the control module 40 should enter the default mode of operation.

In one embodiment, the output command monitor 120 sends the fault signal 460 to the output command generator 110. Upon receiving the fault signal 460, the output command generator 110 enters the default mode, and the default output command generator starts generating the default output command 450. In one embodiment, the output command monitor 120 in one embodiment sends the fault signal 460 to the output command selector 430, which selects the default output command 450 generated by the default output command generator 420 and sends the default output command 450 to the steering assist unit 18 (FIG. 1).

Figure 5:
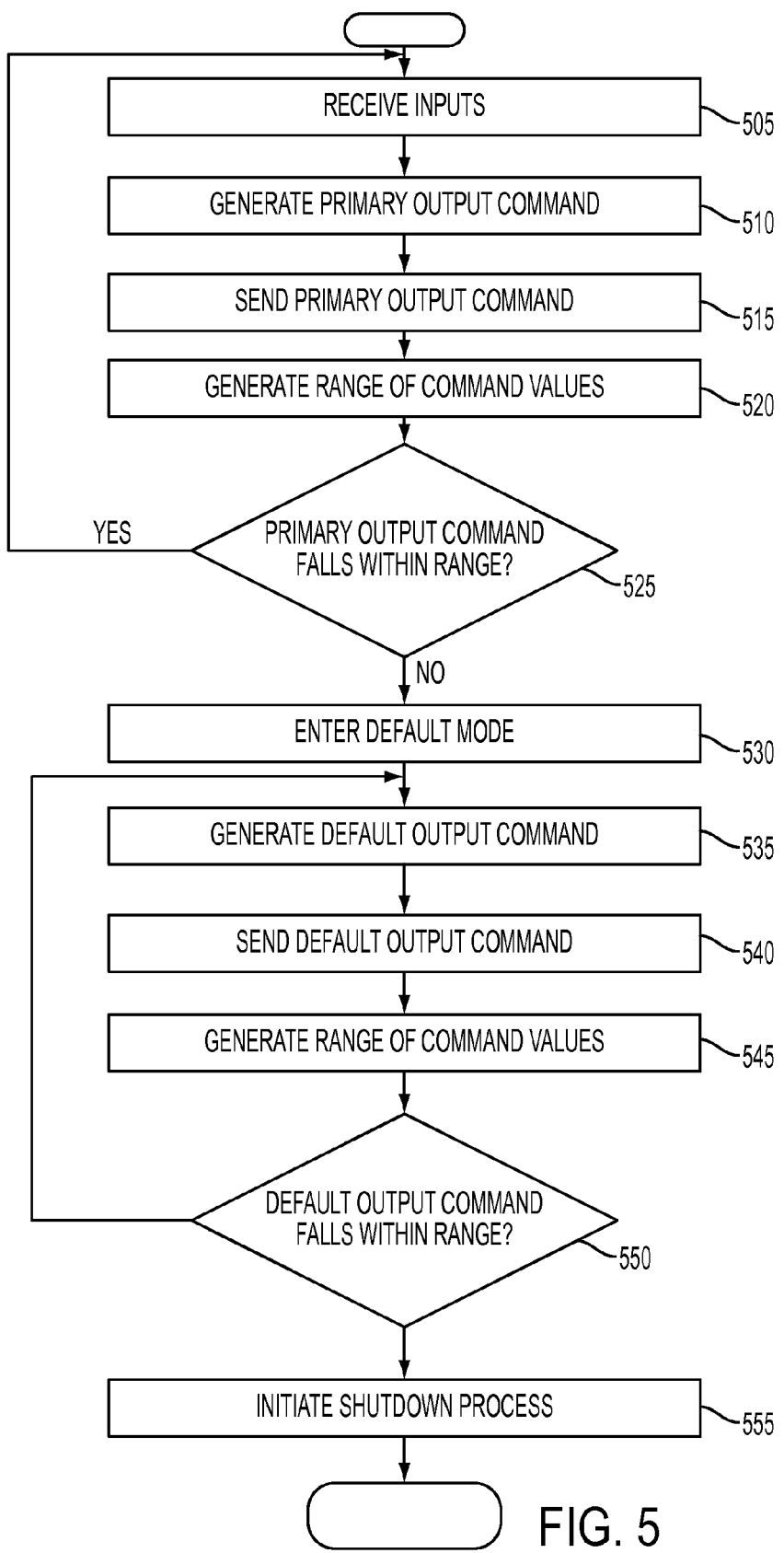
FIG. 5 is flow diagram illustrating a control method for controlling a steering system in accordance with exemplary embodiments.

An example operation of the control module 40 in various embodiments will now be described by reference to FIGS. 1, 4 and 5. FIG. 5 illustrates a flow diagram for a control method that can be performed by the output command generator 110 (including the primary output command generator 410, the default output command generator 420, and the output command selector 430) and the output command monitor 120 of the control module 40. As can be appreciated in light of the disclosure, the order of operation within the method is not limited to the sequential execution as illustrated in FIG. 3, but may be performed in one or more varying orders as applicable and in accordance with the present disclosure.

In one example, the primary output command generator 410 and the output command monitor 120 at block 505 receive a set of input signals 105 from one or more of the sensors 31-33 that generates the signals. At block 510, the primary output command generator 410 generates the primary output command 440 based on one or more of the input signals 105 and using a set of algorithms. At block 515, the output command selector 430 outputs the primary output command 440. That is, the output command selector 430 sends the primary output command 440 as the output command 115 to the steering assist unit 18.

At block 520, the output command monitor 120 generates a range of command values based on one or more of the input signals 105 in a similar manner that the output command monitor generated a range at block 340 described above by reference to FIG. 3. At block 525, the output command monitor 120 determines whether the primary output command 440 is faulty by determining whether the primary output command 440 falls within the range.

Based on determining at block 525 that the primary output command 440 falls within the range, the control module 40 loops back to block 505 so that the control module 40 repeats the operations at blocks 505-525 based on the newer input signals.

Based on determining at block 525 that the primary output command 440 does not fall within the range, the control module 40 enters at block 530 the default mode of operation. The output command monitor 120 generates the fault signal 460. This fault signal 460 indicates that the control module 40 should enter the default mode of operation. In one embodiment, the output command monitor 120 sends at block 540 the fault signal 460 to the output command generator 110. More specifically, in one embodiment, the output command monitor 120 sends the fault signal 460 to the output command selector 430. In one embodiment, however, the control module 40 does not immediately enter the default mode of operation. In such an embodiment, the output command monitor 120 sends the fault signal 460 to the output command generator 110 after the output command 115 goes out of the range for longer than a predefined duration of time.

At block 535, the default output command generator 420 generates the default output command 450 based on one or more of the input signals 105. In one embodiment, the default output command generator 420 generates the default output command 450 in a degraded manner. For example, the default output command generator 420 uses only a subset of the input signals and parameters that the primary output command generator 410 uses. Also, the default output command generator 420 may use algorithms that are simpler than the algorithms that the primary output command generator 410 uses.

At block 540, the output command selector 430 outputs the default output command 450. That is, the output command selector 430 sends the default output command 450 as the output command 115 of the control module 40 to the steering assist unit 18.

At block 545, in one embodiment, the output command monitor 120 generates another range of command values based on one or more of the input signals 105. This range of command values is for determining at block 550 whether the default output command is faulty. In one embodiment, in order to generate this range, the output command monitor 120 uses a subset of the input signals that the output command monitor 120 uses at block 520 to generate the range for determining whether the primary output command is faulty. At block 550, the output command monitor 120 determines whether the default output command is faulty by determining whether the default output command falls within the range of command values generated at block 545.

Based on determining at block 550 that the default output command 450 falls within the range, the control module 40 loops back to block 535 so that the control module 40 repeats the operations at blocks 535-555 in the default mode based on the newer input signals.

Based on determining at block 550 that the default output command 450 does not fall within the range, the control module 40 initiates at block 555 a set of fault response actions in the control module 40 or in the steering system 12. For example, the output command monitor 120 may generate a fault signal 470. In one embodiment, the fault signal 470 is sent to other sub-modules of the control module 40 so that the receiving sub-modules may ignore the output command 115 and use a backup command as inputs.

Figure 6:
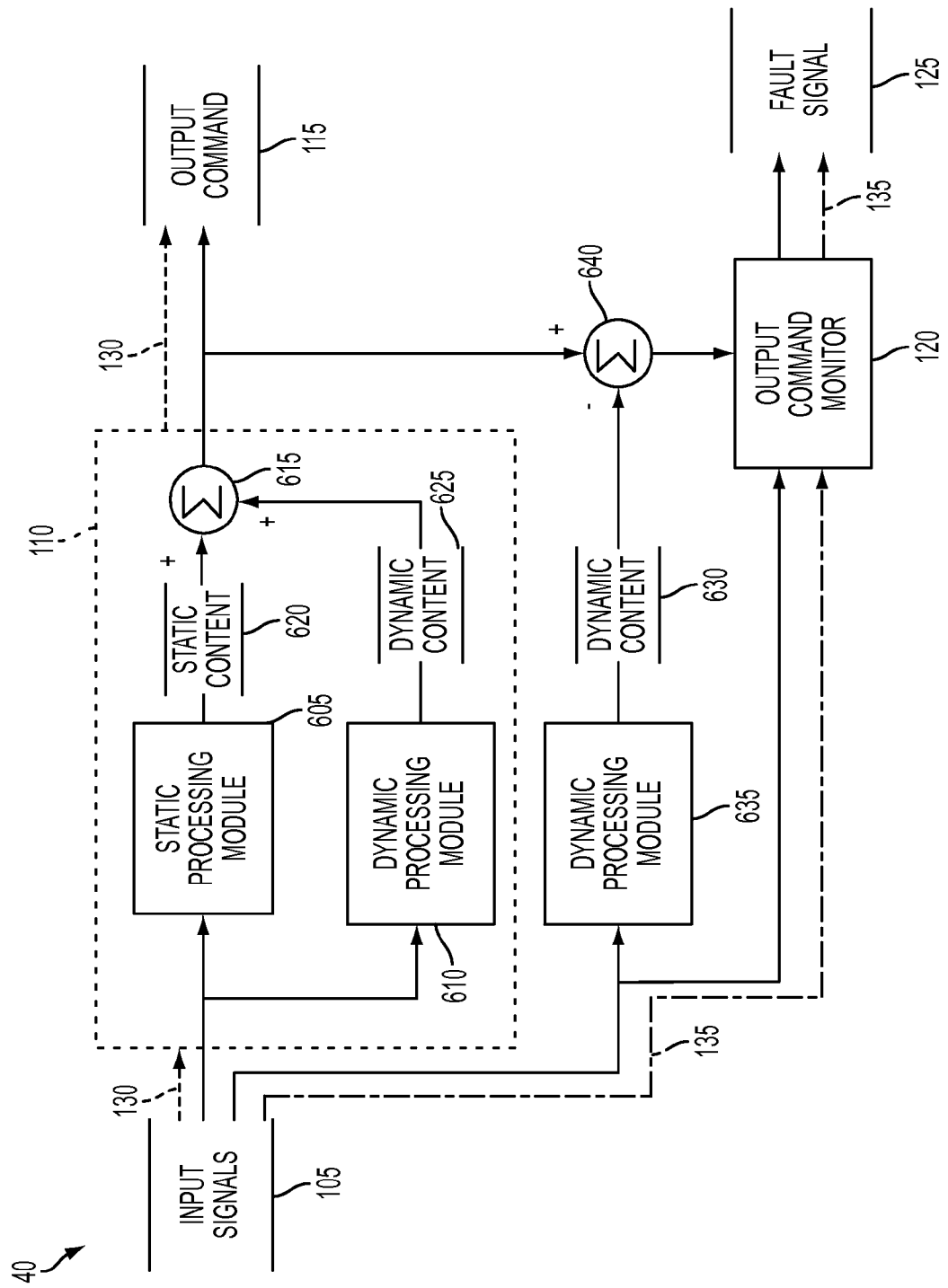
FIG. 6 illustrates a block diagram of a control module that controls a steering system in accordance with exemplary embodiments of the invention.

FIG. 6 illustrates a block diagram of the control module 40 in accordance with exemplary embodiments of the invention. Specifically, FIG. 6 illustrates that the output command 115 includes static content 620 and dynamic content 625 and that the dynamic content of the output command 115 is removed before the output command monitor 120 determines whether the output command 115 is faulty.

In one embodiment, the static content of an output command is generated based on the magnitude characteristics of the input signals. Generally, simple operations (e.g., additions, subtractions, gain calculations, table lookups, etc.) are performed on the magnitude characteristics of the input signals in order to generate the static content of an output command. On the other hand, in one embodiment, the dynamic content of an output command is generated based on the frequency and magnitude characteristics of the input signals. Generally, complex operations (e.g., filtering using state variables and filter time constants) are performed on the frequency and magnitude characteristics of the input signals.

In one embodiment, the output command generator 110 includes a static processing module 605 and a dynamic processing module 610. In one embodiment, the static processing module 605 and the dynamic processing module 610 process the input signals 105 in parallel. That is, the output of the modules 605 or 610 is not fed to the other module as input. As shown, the static processing module 605 generates the static content 620 based on the input signals 105. The dynamic processing module 610 generates the dynamic content 625 based on the input signals 105. The summation block 615 adds up the static content 620 and the dynamic content 625, and the sum is outputted as the output command 115.

In some cases, computing a range of command values for the dynamic content of the output command imposes a performance burden on the output command monitor 120 to the extent that the output command monitor 120 may not verify the output command 115 effectively. Thus, in one embodiment, the control monitor 120 is configured to have another dynamic processing module 635 in the secondary signal path 135 to remove the dynamic content from the output command 115 before the output command monitor 120 verifies the output command 115. As shown, the dynamic processing module 635 generates dynamic content 630 based on the input signals 105. The summation block 640 receives the dynamic content 630 from the dynamic processing module 635 and the output command 115 with the dynamic content 625 from the output command generator 110. The summation block 640 subtracts (as indicated by the negative sign depicted by the summation block 640) the dynamic content 630 from the output command 115. The output command monitor 120 then determines whether the resulting output command with the static content is faulty and generates the fault signal 125.

In one embodiment, the dynamic processing module 635 in the secondary signal path 135 is a replica of the dynamic processing module 610 in the primary signal path 130. The dynamic processing module 635, however, may have some diversity from the dynamic processing module 610. For example, the dynamic processing module 635 may implement different algorithms for processing the input signals. Or, the dynamic processing module 635 may achieve the diversity by using different levels of precision in calculation (e.g., numerical precision—fixed-point, floating point, etc.) while using the same algorithm(s) that the dynamic processing module 610 uses.

Figure 7:
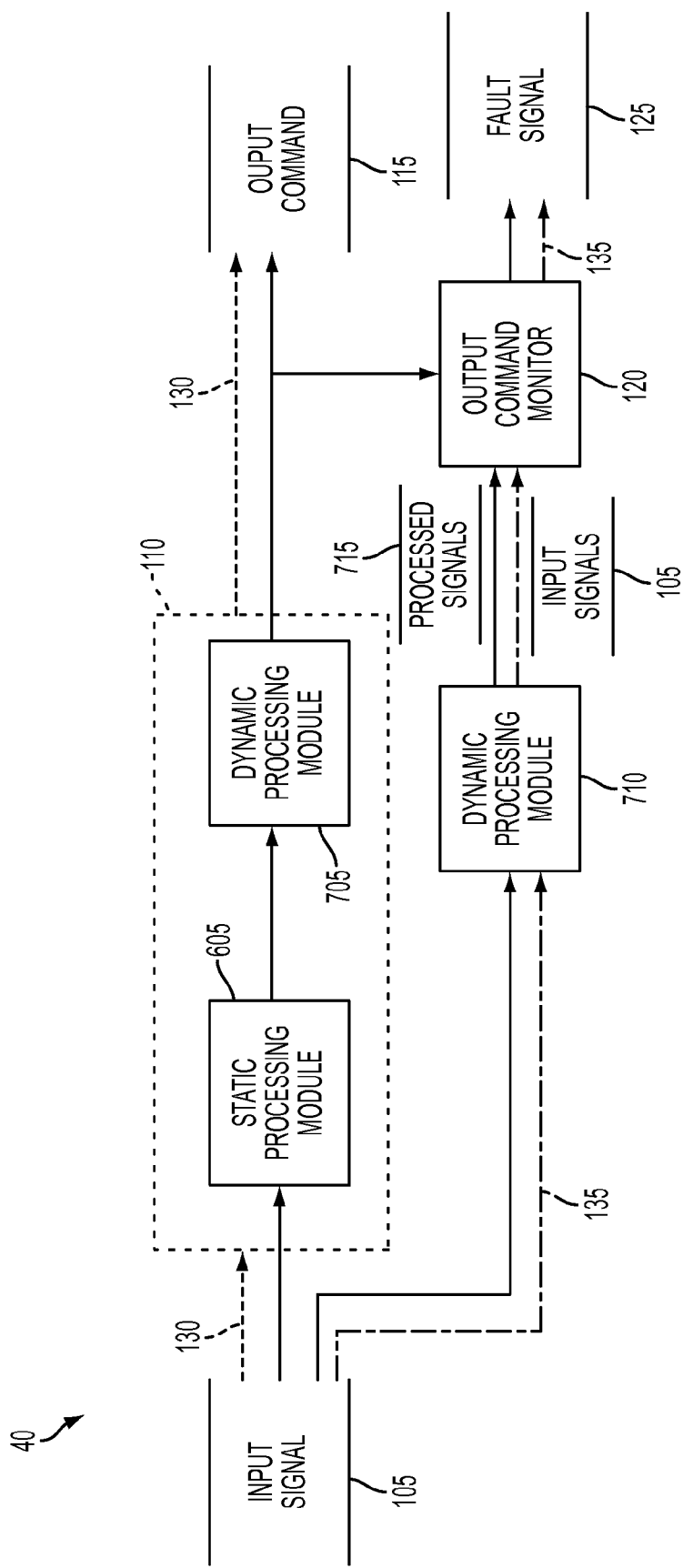
FIG. 7 illustrates a block diagram of a control module that controls a steering system in accordance with exemplary embodiments of the invention.

FIG. 7 illustrates a block diagram of the control module 40 in accordance with exemplary embodiments of the invention. Specifically, FIG. 7 illustrates that the output command generator 110 includes the static processing module 605 and a dynamic processing module 705 in series in the primary signal path 130. The control module 40 includes a dynamic processing module 710 and the output command monitor 120 in series in the secondary signal path 135.

The dynamic processing module 705 is similar to the dynamic processing module 610 described above by reference to FIG. 6 in that the dynamic processing module 705 performs complex operations (e.g., filtering using state variables and filter time constants) on the frequency and magnitude characteristics of the input. However, the dynamic processing module 705 is in series with the static processing module 605. In one embodiment, the input to the dynamic processing module 705 is the output of the static processing module 605. Therefore, the resulting output command 115 is multiplicative of the static content and the dynamic content. In contrast, the output command 115 produced by the dynamic processing module 610 and the static processing module 605 in parallel as illustrated in FIG. 6 is additive of the static content and the dynamic content.

Having the static processing module 605 and the dynamic processing module 705 in series, the output command generator 110 in FIG. 7 takes more time to produce the output command 115 based on the input signals 105 than the output command monitor 120 does to generate the range of command values based on the input signals 105 received concurrently. That is, the output command 115 generated by the output command generator 110 may lag in time with respect to the generation of the range of command values. The lag may cause incorrect verification of the output command 115 because the range of command values that the output command monitor 120 generates and uses may not be the correct range as the values of the input signals 105 may change in time.

In one embodiment, the control module 40 is configured to have the dynamic processing module 710 in series with the output command monitor 120. Specifically, the dynamic processing module 710 processes the input signals 105 and feeds the processed signals 715 into the output command monitor 120. In one embodiment, the dynamic processing module 710 also sends the input signals 105, which are delayed by an amount of time that the dynamic processing module 710 spends on generating the processed signals 715, to the output command monitor 120. With this delay, the range of command values that the output command monitor 120 generates and uses is temporally correct for verifying the output command 115. In one embodiment, the output command monitor 120 also uses the processed signals 715 to generate the range of command values.

In one embodiment, the dynamic processing module 710 in the secondary signal path 135 is a replica of the dynamic processing module 705 in the primary signal path 130. The dynamic processing module 710, however, may have some diversity from the dynamic processing module 705. For example, the dynamic processing module 710 may implement different algorithms for processing the input signals. Or, the dynamic processing module 710 may achieve the diversity by using different levels of precision (e.g., fixed-point vs. floating point) while using the same algorithm as the dynamic processing module 705 uses.

In some cases, the static processing module 605 and the dynamic processing module 705 in series may raise issues with the stability of the control module 40. For example, when the output signal of the static processing module 605 is faulty, this faulty signal is fed into the dynamic processing module 705. The resulting output command 115 from the dynamic processing module 705 would be faulty even if the dynamic processing module 705 is not the cause of the faulty signal.

Figure 8:
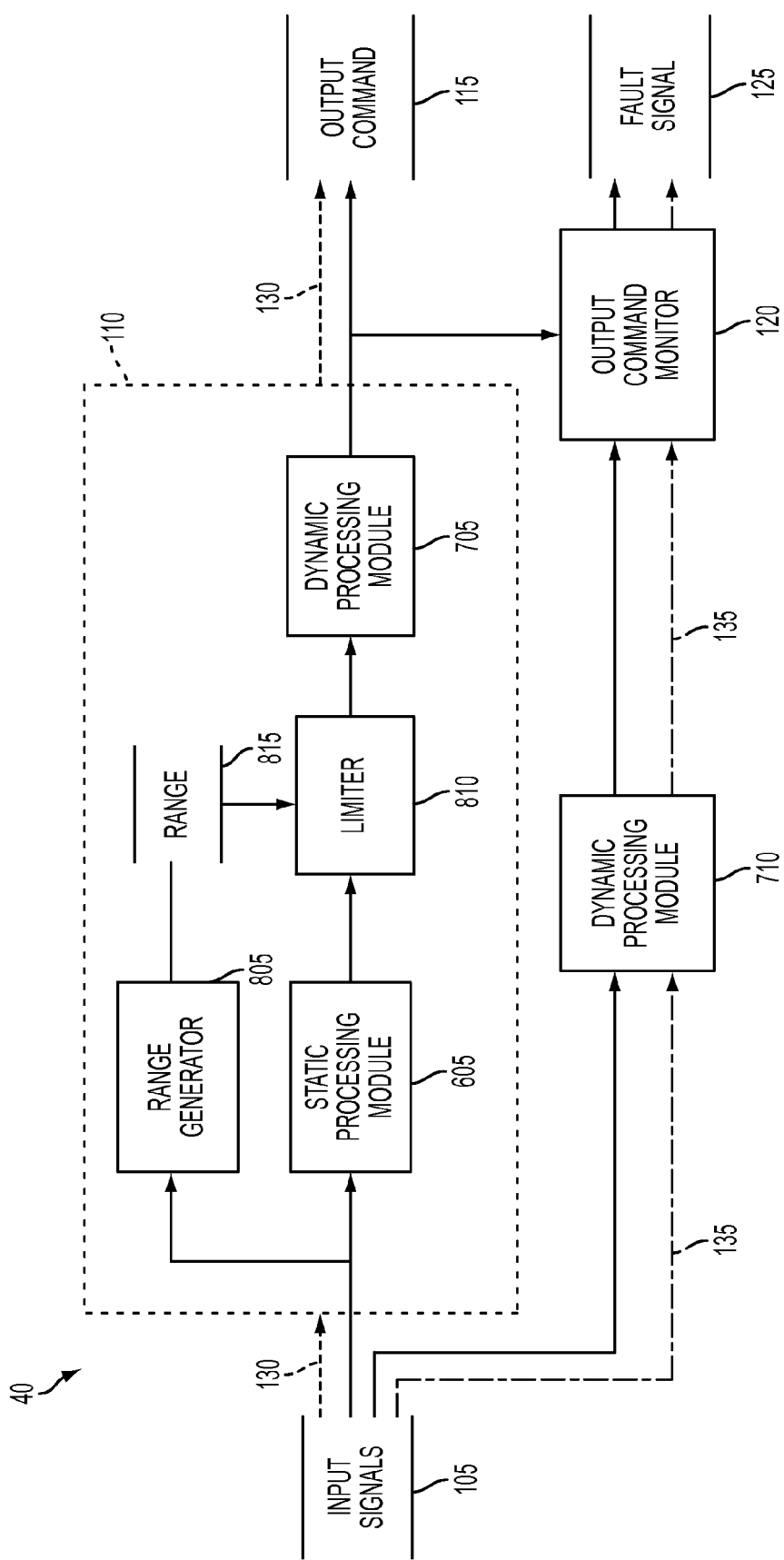
FIG. 8 illustrates a block diagram of a control module that controls a steering system in accordance with exemplary embodiments of the invention.

FIG. 8 illustrates a block diagram of the control module 40 in accordance with exemplary embodiments of the invention. The control module 40 of these embodiments limits the output of the static processing module 605 to prevent the output of the static processing module 605 from being faulty. FIG. 8 illustrates that the output command generator 110 includes a range generator 805 and a limiter 810 in addition to the static processing module 605 and the dynamic processing module 705 in series in the primary signal path 130. Also, the control module 40 includes the dynamic processing module 705 and the output command monitor 120 in series in the secondary signal path 135.

In one embodiment, the range generator 805 is a replica of the output command monitor 120 but the range generator 805 only generates a range of command values 815 based on the input signals 105 and does not generate a fault signal. The range generator 805 sends the generated range of command values to the limiter 810, which limits the output from the static processing module 605 to the range. The limited output of the limiter 810 is then passed to the dynamic processing module 705, which generates the output command 115. In one embodiment, the range 815 is substantially the same as the range (not shown) that is generated and used by the output command monitor 120 to verify the output command 115.

In some cases, the control module 40 takes overlay and scale factors as inputs. In one embodiment, the overlay and scale factors are command offsets and gains that are supplied from sources external to the control module 40 for the purpose of augmenting the performance of the steering system 12 (FIG. 1) when the steering system 12 receives the output command 115 from the control module 40. That is, the output command 115 generated based on the overlay and scale factors may command the steering system 12 to generate more or less output (e.g., assist torque) than the output command 115 generated without the overlay and scale factors would have commanded to generate.

Figure 9:
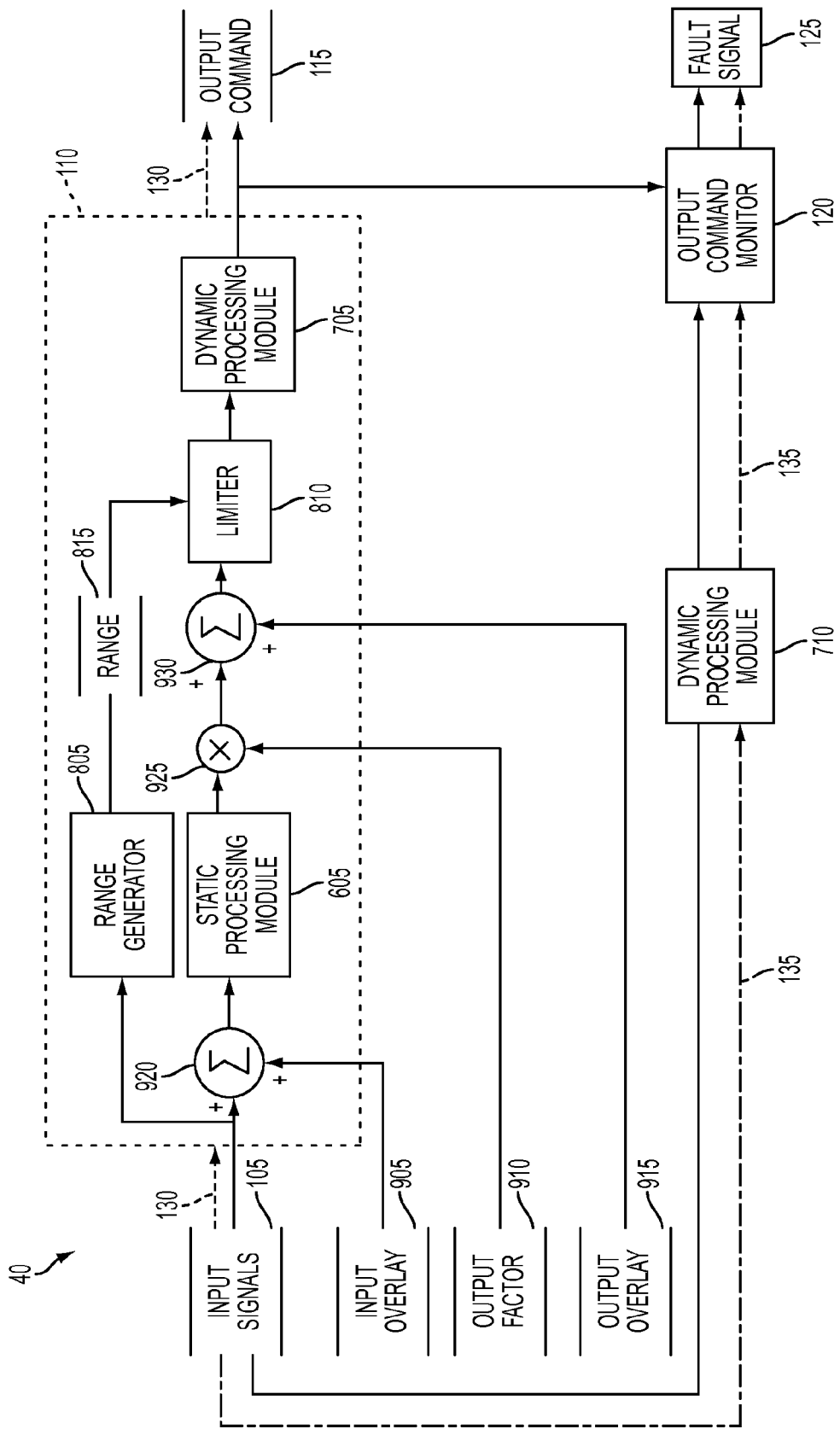
FIG. 9 illustrates a block diagram of a control module that controls a steering system in accordance with exemplary embodiments of the invention.

FIG. 9 illustrates a block diagram of the control module 40 in accordance with exemplary embodiments of the invention. In one embodiment, the output command generator 110 of the control module 40 includes summation blocks 920 and 930 and a multiplication block 925 in addition to the range generator 805, the limiter 810, and the static processing module 605 and the dynamic processing module 705 in series, in the primary signal path 130. Also, the control module 40 includes the dynamic processing module 705 and the output command monitor 120 in series in the secondary signal path 135. The control module 40 takes as inputs an input overlay 905, an output factor 910, an output overlay 915 in addition to the input signals 105.

In one embodiment, the summation block 920 adds the input overlay 905 to one or more of the input signals 105. The static processing module 605 processes the sum of the signals 105 and 905. The output of the static processing module 605 is then multiplied by the output factor 910 at the multiplication block 925. The summation block 930 adds the resulting product from the multiplication block 925 and the output overlay 915. The limiter then limits the resulting sum from the summation block 930 to a range of command values that the range generator 805 generates. The rest of the operations that the control module 40 performs to generate the output command 115 and/or the fault signal 125 is similar to the description of the FIGS. 7 and 8.

It is to be noted that the embodiments illustrated in FIGS. 4 and 6-8 may be combined in different combinations and permutations. For example, the embodiments described by reference to FIG. 6 may take as inputs the input overlay 905, the output factor 910, and/or the output overlay 915. Also, the range generator and the limiter 810 may be used in the embodiments described by reference to FIG. 4 or 6.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method for generating and verifying an output command for using in a power steering system, the method comprising:
    receiving, by a module having at least a primary processing path and a secondary processing path that is in parallel with the primary processing path, a set of input signals;
    in the primary processing path:
        generating a primary output command based on the set of input signals; and
        sending the primary output command out of the module; and
    in the secondary processing path:
        generating a first range of command values based on the set of input signals;
        determining whether the primary output command falls within the range of command values; and
        based on determining that the primary output command does not fall within the first range of command values, generating a fault signal.

2. The method of claim 1 further comprising:
    in the primary processing path:
        in response to the fault signal, generating a default output command based on a subset of the input signals; and
        sending the default output command out of the module.

3. The method of claim 2 further comprising:
    in the secondary processing path:
        generating a second range of command values based on a subset of the input signals;
        determining whether the default output command falls within the second range of command values; and
        based on determining that the default output command does not fall within the second range of command values, initiating a fault response action in the power steering system.

4. The method of claim 1 further comprising, in the secondary processing path, initiating a fault response action in the power steering system.

5. The method of claim 1,
    wherein the generating the primary output command comprises:
        generating static content and first dynamic content based on the set of input signals; and
        adding the static content and the first dynamic content to generate the primary output command,
    wherein the method further comprises, in the secondary processing path:
        generating second dynamic content based on the set of input signals; and
        subtracting the second dynamic content from the primary output command.

6. The method of claim 1,
    wherein the generating the primary output command comprises:
        generating static content based on the set of input signals; and
        performing a first dynamic processing on the static content to generate the primary output command,
    wherein the method further comprises, in the secondary processing path:
        performing a second dynamic processing on the set of input signals prior to generating the first range of command values.

7. The method of claim 6 further comprising:
    in the primary processing path:
        generating a third range of command values based on the set of input signals, the third range being substantially same as the first range; and
        limiting the static content to the third range of command values.

8. The method of claim 6 further comprising:
    in the primary processing path:
        receiving at least one of an input overlay signal, an output factor signal, and output overlay signal;
        adding the input overlay signal to the set of input signals in response to receiving the input overlay signal;
        multiplying the static content by the output factor signal in response to receiving the output factor signal; and
        adding the output overlay signal to the static content in response to receiving the output overlay signal.

9. The method of claim 6, wherein the first dynamic processing is based on a first algorithm, and the second dynamic processing is based a second algorithm.

10. The method of claim 6, wherein the first dynamic processing and the second dynamic processing are based on a same algorithm but are based on different levels of numerical precision.

11. A control system for controlling a power steering system, the control system comprising:
    a primary processing path;
    a secondary processing path in parallel with the primary processing path;
    a first module in the primary processing path, the first module configured to:
        generate a primary output command based on a set of input signals; and
        outputting the primary output command; and a second module in the secondary processing path, the second module configured to:
   generate a first range of command values based on the set of input signals;
   determine whether the primary output command falls within the range of command values; and
   based on determining that the primary output command does not fall within the first range of command values, generate a fault signal.

12. The control system of claim 11,
wherein the second module is further configured to send the fault signal to the first module
wherein the first module is further configured to:
   in response to receiving the fault signal, generate a default output command based on a subset of the input signals; and
   output the default output command.

13. The control system of claim 12, wherein the second module is further configured to:
   generate a second range of command values based on a subset of the input signals;
   determine whether the default output command falls within the second range of command values;
   based on determining that the default output command does not fall within the second range of command values, initiating a fault response action in the power steering system.

14. The control system of claim 11, wherein the second module is further configured to initiate a fault response action in the power steering system.

15. The control system of claim 11,
wherein the first module is configured to generate the primary output command by:
   generating static content and first dynamic content based on the set of input signals; and
   adding the static content and the first dynamic content to generate the primary output command,
wherein the first module is further configured to:
   generate second dynamic content based on the set of input signals; and
   subtract the second dynamic content from the primary output command.

16. The control system of claim 11,
wherein the first module is configured to generate the primary output command by:
   generating static content based on the set of input signals; and
   performing a first dynamic processing on the static content to generate the primary output command,
wherein the second module is further configured to perform a second dynamic processing on the set of input signals prior to generating the first range of command values.

17. The control system of claim 16, wherein the first module is further configured to:
   generate a third range of command values based on the set of input signals, the third range being substantially same as the first range; and
   limit the static content to the third range of command values.

18. The control system of claim 16, wherein the first module is further configured to:
   receive at least one of an input overlay signal, an output factor signal, and output overlay signal;
   add the input overlay signal to the set of input signals in response to receiving the input overlay signal;
   multiply the static content by the output factor signal in response to receiving the output factor signal; and
   add the output overlay signal to the static content in response to receiving the output overlay signal.

19. The control system of claim 16, wherein the first dynamic processing is based on a first algorithm, and the second dynamic processing is based a second algorithm.

20. The control system of claim 16, wherein the first dynamic processing and the second dynamic processing are based on a same algorithm but are based on different levels of numerical precision.

* * * * *